United States Patent [19] [11] 3,921,137

McClearn, Jr. et al. [45] Nov. 18, 1975

[54] SEMI STATIC TIME DIVISION MULTIPLEX SLOT ASSIGNMENT

[75] Inventors: Carl Meade McClearn, Jr., Kingston; Thomas Alva Edison Miller, Red Hook, both of N.Y.

[73] Assignee: International Business Machines Corporation, Armonk, N.Y.

[22] Filed: June 25, 1974

[21] Appl. No.: 482,940

[52] U.S. Cl. ..... 340/147 R; 179/15 AL; 179/15 AQ

[51] Int. Cl. ..... H04j 3/00; H04q 9/00

[58] Field of Search ..... 340/147 R, 147 C, 147 CN; 179/15 AL, 15 AQ, 15 AT

[56] References Cited

UNITED STATES PATENTS

| | | | |
|---|---|---|---|
| 3,483,329 | 12/1969 | Hunkins et al. | 340/147 R |
| 3,544,976 | 12/1970 | Collins | 340/172.5 |
| 3,632,881 | 1/1972 | Graham | 179/15 AL |
| 3,639,904 | 2/1972 | Arulpragasam | 340/147 R |
| 3,644,678 | 2/1972 | Schmidt | 179/15 BA |
| 3,705,267 | 12/1972 | Marino | 179/15 AQ |
| 3,732,374 | 5/1973 | Rocher et al. | 179/15 AL |
| 3,751,597 | 8/1973 | Bonyhard | 179/15 AQ |
| 3,796,835 | 3/1974 | Closs et al. | 179/15 AL |
| 3,845,472 | 10/1974 | Buchanan et al. | 340/147 R |

*Primary Examiner*—Donald J. Yusko
*Attorney, Agent, or Firm*—Karl O. Hesse

[57] ABSTRACT

A plurality of time division multiplexed time slots circulate on a loop communication link, some of said time slots being permanently assigned to terminals connected to the loop and others being temporarily assigned to terminals such as on an every third or every fifth slot basis by an extra slot count command. One use of a write echo command allows even permanently assigned time slots to be temporarily utilized by a terminal having a very high data rate.

12 Claims, 4 Drawing Figures

SEMI STATIC TIME DIVISION MULTIPLEX SLOT ASSIGNMENT

BACKGROUND OF THE INVENTION

1. Field of the Invention

This invention relates to communications systems in general and, more particularly, to serial loop communications systems in which data is transmitted in one direction around a loop transmission means.

2. Description of the Prior Art

Loop data communications systems have been known for several years and several control techniques have been devised in order to allow a master terminal or controller to communicate with a plurality of I/O terminals connected to the loop. One advantageously simple technique involves a form of time division multiplexing in which various time slots are permanently assigned to I/O terminals. Messages to and from I/O terminals are transmitted in the permanently assigned time slots. It is apparent that such a system is relatively inefficient for interactive I/O terminals since the communications capacity of a permanently assigned time slot is wasted during periods of inactivity of the associated I/O terminal.

To allow other terminals to use time slots not being used, addressed message communications systems have been developed wherein data is preceded by the address of the receiving terminal. These systems are also inefficient because bandwidth is consumed in transmission of addresses which would otherwise be available for data transmission. Furthermore, contention problems arise wherein two or more terminals attempt to transmit at the same time. Contention has been resolved by having the master terminal poll each of the I/O terminals for messages or by hub polling wherein each I/O terminal, after being polled, polls the next I/O terminal. These polling procedures likewise reduce bandwidth available for data transmission and further complicate the communication system.

SUMMARY OF THE INVENTION

It is an object of this invention to provide a more efficient loop communication system having the simplicity of static time division multiplexed time slot assignment.

It is a further object of this invention to provide an improved loop communication system having high transmission efficiency and dynamically variable time division multiplexed time slot assignment.

It is still further object of this invention to provide an improved loop communication system which is specifically adapted to be controlled by a computer.

It is an even further object of this invention to provide a loop communication system wherein terminals connected to the loop have an opportunity to transmit and receive at least once during each time frame and wherein selected terminals have an opportunity to transmit and receive an integer number of additional times during each time frame.

It is an even still further object of this invention to provide an improved time division multiplex loop communication system which is capable of allowing a controlling computer to allow a terminal to use some or all of the time slots which have been assigned to another terminal.

These and further objects of the invention which will become apparent upon a reading of the specification in conjunction with the attached drawings are obtained by providing frames of time slots circulating on a loop transmission link with each frame comprising a substantially larger number of contiguous time separated data slots than the maximum number of terminals connected to the loop. One time slot is permanently assigned to each terminal connected to the loop allowing the master terminal or controller to selectively communicate with each remote terminal without the need for transmission of addresses. In addition to the permanently assigned or base slot, each I/O or remote terminal can communicate with the master terminal on dynamically assigned additional slots such as every third slot following the base slot or every fifth slot following the base slot and so forth. These extra slots are assigned to an I/O terminal from the master terminal by transmission of a command to load a slot register with a number such as 3 or 5. Each I/O terminal also includes an extra slot counter which is advanced every time a time slot is received. When the contents of the extra slot counter equal the contents of the slot register, a compare signal is generated which causes the I/O terminal to recognize the present slot as being assigned to it. Further economy in transmission is achieved without sacrificing reliability by providing time slots capable of containing two characters so that information can be transmitted in redundant mode when full duplex communication is desired or in echo mode when simplex communication is desired. In order to allow unlimited combinations of eight bit characters to be used for data, while at the same time providing for the communication of commands, command responses, and data, modifier bit positions are provided within each time slot for the purpose of identifying the significance of the following eight bit characters within the time slot.

Additional flexibility is provided by allowing a controlling computer at the master terminal to issue a write echo command to a non-existant device at a first remote terminal and an extra slot command to a second remote terminal to temporarily allow the second remote terminal to use all of the first terminals assigned slots.

The foregoing and other objects and features of the invention will be apparent from the following more particular description of a preferred embodiment of the invention as illustrated in the accompanying drawings.

A PREFERRED EMBODIMENT OF THE INVENTION

Figure 1:
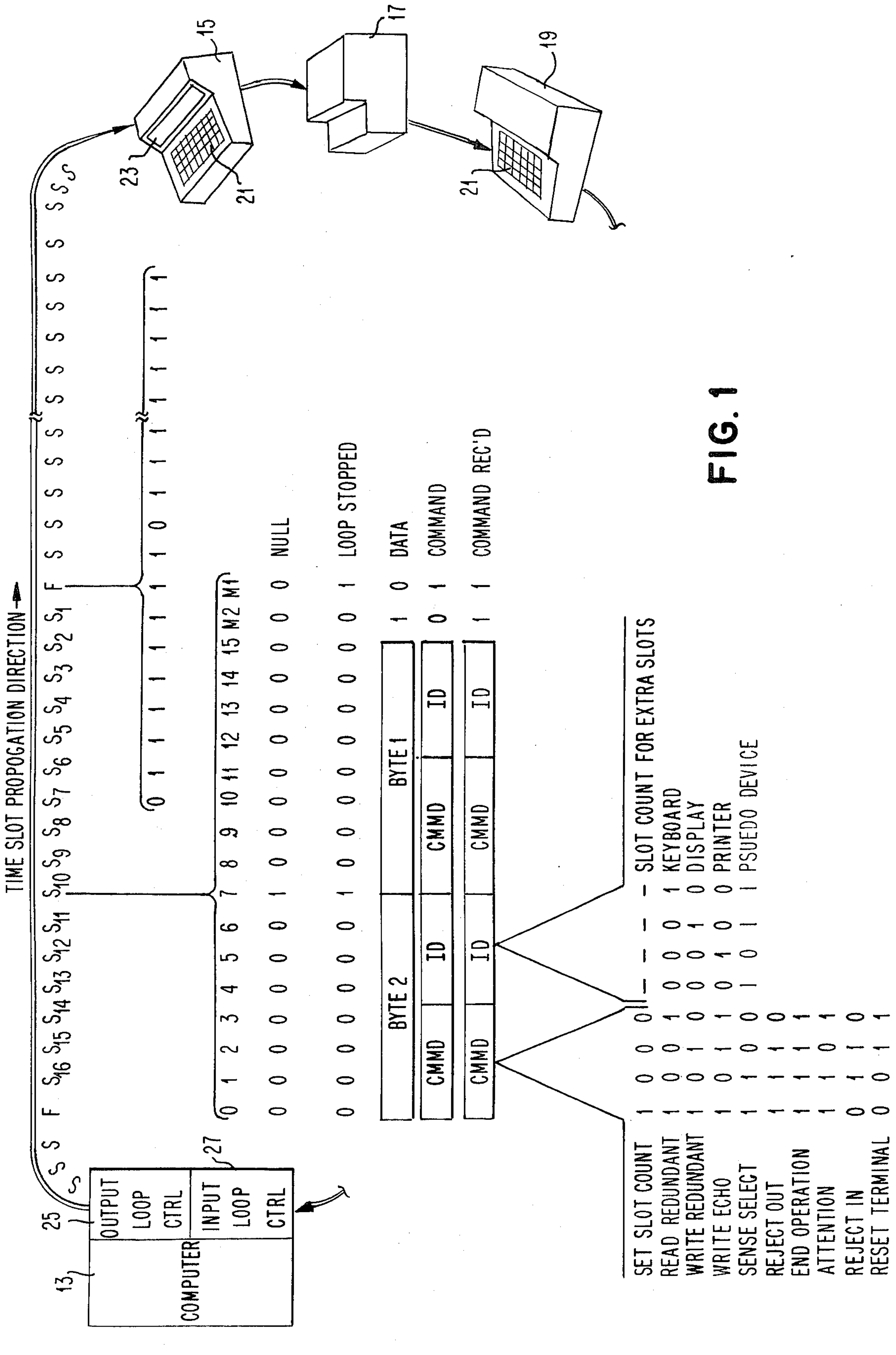
FIG. 1 illustrates the base arrangement of the invention as it is used in a typical application in connection with a computer and a plurality of input/output terminal devices.

Referring now to FIG. 1, an example detailed embodiment of the invention is shown in conjunction with a computer 13 and a plurality of remote terminals 15, 17, and 19. Terminal 15 and 19 each have a keyboard 21 and a display 23. Terminal 17 contains only a printer.

In order to provide for communication between computer 13 and terminals 15 through 19, output loop control 25 is provided which generates a plurality of frame time slots which are used for synchronization purposes, and are separated by a plurality of information time slots which can be assigned to the terminals in a multiplexed sequence. Each terminal has at least one of the information time slots permanently assigned to it. For example, slot S1 may be assigned to terminal 17, slot S2 assigned to terminal 15, and slot S3 assigned to terminal 19. Whenever computer 13 or one of the remote terminals wishes to communicate, the message is placed in the slots assigned to the respective remote terminal.

Figure 2:
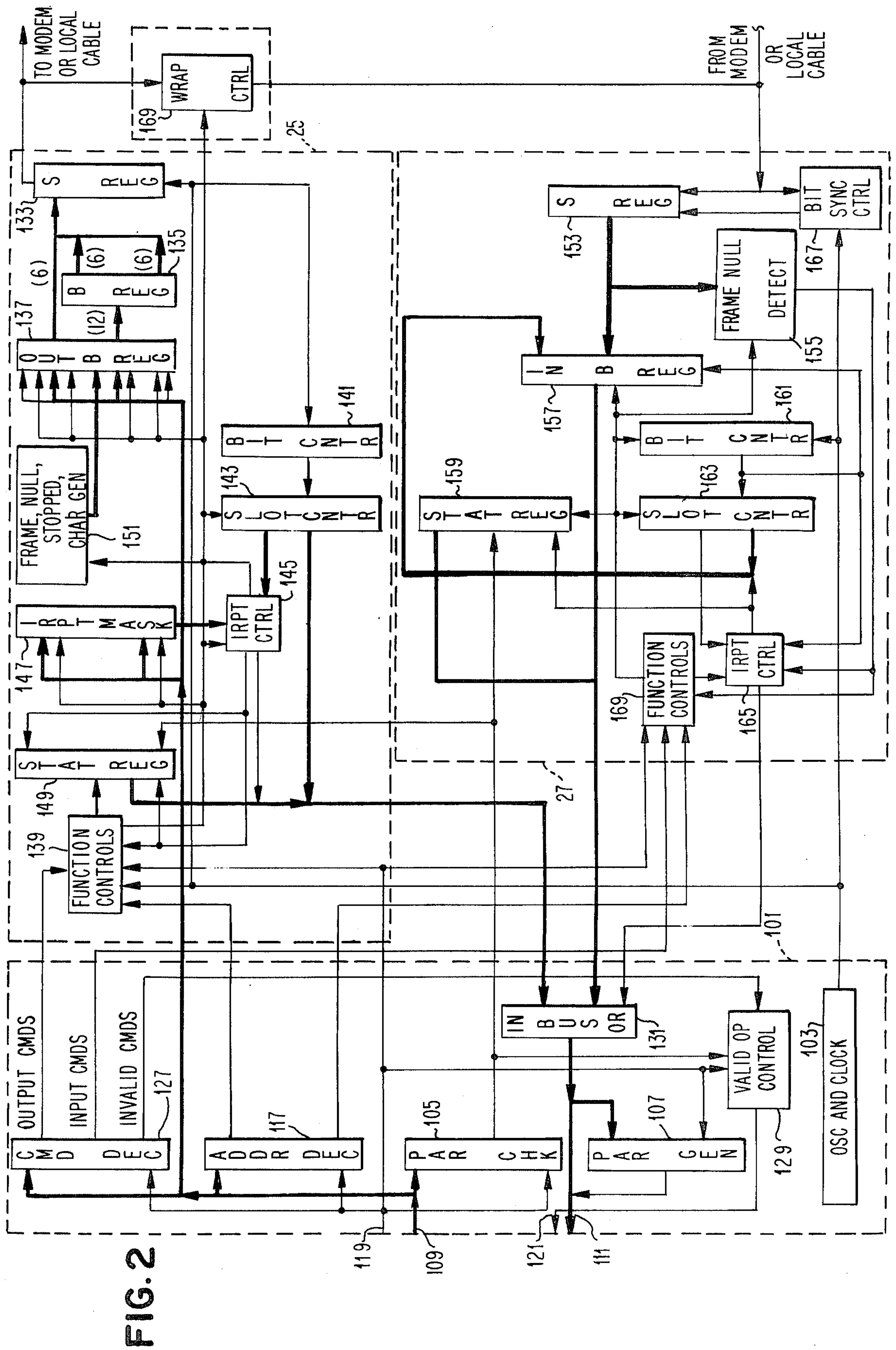
FIG. 2 illustrates logic circuitry for connecting a loop communication link which operates in accordance with the invention to a computer.

The frame time slots and the information time slots are generated by output loop control 25 which is shown in greater detail in FIG. 2. Although more than one frame of slots is pictorially shown in FIG. 1, the actual electronic time delays around a loop connected transmission line is usually less than one or two time slots. Thus the first bit positions of a first time slot will begin to appear at input loop control 27 while the second or third time slot is being propagated out of output loop control 25. As will be seen by reference to FIG. 3, each remote terminal contains latches in series with the loop and thus contributes approximately one bit time to this total loop delay. Thus if eight remote terminal stations are connected to the loop, eight bits of delay will be introduced by the terminals themselves. In addition, if the loop goes out over common carrier lines, each modem (modulator demodulator) will introduce a delay approximately equal to one or two bit times. This modem delay is often required by the modem in order to properly modulate and demodulate the binary bits when the loop transmission speed is such that intersymbol interference occurs on the common carrier transmission link. Thus, although it would appear from FIG. 1, that the loop delay is in the order of 20 or more slot times, actual loop delay will be in the order of approximately 20 bit times, depending upon the number of terminals and number of modems in the loop.

As can be seen with reference to FIG. 1, each information slot time is divided into 18 bit times comprising two modifier bit positions followed by two information bytes. The contents of the information bytes is designated by the state of the modifier bits M1 and M2. If the information carried in the following two bytes is data, modifier bits M1 and M2 will be a binary zero and one respectively. If the information carried in the following two bytes is a command, modifier bits M1 and M2 will be a binary one and zero respectively. When the command is received by a terminal assigned to the slot carrying the command, modifier bit M2 is changed from a zero to a one and the command is echoed bach to the central controller with both modifier bits being binary ones. If the terminal to which the command was sent is unable to accept the command (e.g. is busy or out of sync) the command will be echoed back to computer 13 without modifier bit M2 being changed. If data or commands are not available for an assigned terminal at the time an information slot is sent out from output loop control 25, a null or loop stopped bit pattern will be sent out. However, if computer 13 has determined from input loop control 27 that the loop is not in synchronism, loop stopped bit patterns will be sent out. In this manner, all terminals on the loop are alerted that the input loop control 27 is not synchronized to the output loop control 25.

If computer 13 does not desire to communicate in an information slot, a zero bit will be loaded into a corresponding bit position of interrupt mask register 147 shown in FIG. 2 which controls interrupt control 145 and null character generator 151 to inhibit an interrupt and send a null bit pattern in the information time slot.

As shown in FIG. 1, commands are always transmitted in redundant mode. That is, each command is duplicated in each of the two byte positions of an information time slot. In the preferred embodiment, each command comprises four higher order bits of information such as set slot count 1000, read redundant 1001, write redundant 1010, write echo 1011, and so forth, as shown in FIG. 1. Preceding these higher order bits of instruction, each command includes four lower order device type identifier bits to identify the specific device such as a keyboard, or printer, at the remote terminal assigned to the particular slot in which the command is being propagated. The four lower order bit positions for the set slot count command contain the slot count which is to be loaded in the slot count register.

As shown in FIG. 1, data is sent out from computer 13 in either redundant mode (write redundant) or in echo mode (write echo). As the two redundant data bytes are received at a terminal, they are not echoed back but are reset to null bit pattern to avoid needlessly interrupting computer 13 or they are replaced with in bound data such as from a keyboard.

Data which is sent out in echo mode has two different data bytes in each time slot. In order to indicate to computer 13 that the data bytes were received at the remote terminal, the bits of the second byte are inverted. The computer 13 must compare the first byte with the first byte send and the second byte with the one's complement of the second byte sent to detect transmission errors.

Referring now to FIG. 2, the detailed logic by which the loop of this preferred embodiment of the invention is connected to computer 13 will be described. Computer 13 may be any of a number of generally known and commercially available digital data processing units such as the International Business Machines Corporation System 360 machine described in U.S. Pat. No. 3,400,371. Any general purpose computer can be utilized, because it is the loop communications system which is the subject of this invention and not the computer itself or even the specific interface hardware. Reference is made to U.S. Pat. No. 3,714,635 as showing interface hardware which is analagous to the hardware of FIG. 2 in many respects. For this reason, only those circuits of FIG. 2, which substantially differ from that of U.S. Pat. No. 3,714,635 will be described in any great detail.

FIG. 2 comprises three major portions. These are common logic 101, output loop control 25 and input loop control 27. Common logic 101 includes oscillator and clock circuits 103 for providing timing signals which will be utilized by the remainder of the logic. Parity check 105 and parity generator 107 monitor for correct parity on 9 bit wide I/O bus OUT 109 from the computer 13 and generates the correct parity on 9 bit wide I/O bus IN 111 to the computer 13. Output loop control 25 and input loop control 27 are each recognized by computer 13 as a separate input output units, even though these units share common logic 101. Computer 13 communicates with output loop control 25 and input loop control 27 by placing a byte on out but 109 representing an address, a command, or data and activating address TA, command TC, or data TD tag line of tag lines 119 respectively. Address decode 117 decodes the specific address whenever it appears in conjunction with an active TA signal on tag lines 119 to activate function control 139 or 169 depending upon which of the two addresses was received. Following the address, the actual command bit pattern will be received at command decode circuits 127 along with an active command tag TC signal on tag lines 119. Each different command will activate a different one of the output commands lines or a different one of the input commands lines or the invalid command line if the particular bit pattern received in conjunction with the command tag signal is an invalid command bit pattern. The invalid command line from command decode 127 and the parity check output of parity check 105 are both connected to valid operation control circuitry 129 which generates a valid signal on tag in line 121 unless an invalid, bit pattern has been received on the I/O bus OUT 109. Example commands received by command decode 127 from computer 13 are:

| | | | | | | | | |
|---|---|---|---|---|---|---|---|---|
| START LOOP | 1 | 1 | 0 | 1 | 1 | 1 | 0 | 0 |
| STOP LOOP | 1 | 1 | 1 | 0 | 1 | 1 | 0 | 0 |
| WRITE SLOT | M1 | M2 | 0 | 0 | 1 | 1 | 0 | 0 |
| WRITE SLOT H | 0 | 0 | 1 | 1 | 1 | 1 | 0 | 0 |
| READ SLOT L | 0 | 1 | 1 | 1 | 0 | 0 | 0 | 1 |
| READ SLOT | 1 | 0 | 1 | 1 | 0 | 0 | 0 | 1 |
| WRITE MASK L | 0 | 1 | 1 | 1 | 1 | 1 | 0 | 0 |
| WRITE MASK H | 1 | 0 | 1 | 1 | 1 | 1 | 0 | 0 |
| SET STATUS | 0 | 0 | 0 | 0 | 0 | 1 | 1 | 0 |
| READ STATUS | 0 | 0 | 0 | 0 | 0 | 1 | 1 | 1 |
| RESET STATUS | 0 | 0 | 0 | 0 | 0 | 1 | 0 | 0 |
| RESET | 0 | 0 | 0 | 0 | 0 | 0 | 1 | 0 |
| WRAP CONTROL | 0 | 0 | 0 | 1 | 1 | 1 | 0 | 0 |
| WRAP MODEM | 0 | 1 | 0 | 1 | 1 | 1 | 0 | 0 |

These commands are largely self-explanatory and, therefore, their explanation will be limited to the few examples recited in conjunction with the following description of the drawings.

In order to transfer status information and the contents of the slot counter from output loop control 25 as well as status, slot count, or information received from the loop from input loop control 27 to I/O bus IN 111, a plurality of OR gates 131 is provided as part of the common logic. The output of OR gates 131 is also connected to parity generator 107 so that proper parity can be assigned to each information byte as it is transferred to computer 13.

In order to provide the continuous sequence of frame time slots and information time slots, an output shift register 133 is provided in output loop control 25. Output shift register 133 is shifted by oscillator and clock 103 to place its contents on the loop transmission link one bit at a time. Output shift register 133 is seven bit positions long and therefore must be loaded three times in order to transmit an entire slot containing eighteen bits. Output shift register 133 is loaded from buffer registers 135 and 137. Buffer register 137 has eighteen bit positions for storing all eighteen bits of a time slot. While the last bit of the previous time slot is being shifted out of out shift register 133, the first six bits of the next time slot are transferred from buffer register 137 to the lower order six bit positions of shift register 133. While the first six bits of the next time slot are being transferred to shift register 133, the remaining twelve bits are transferred to intermediate buffer register 135 for temporary storage while the contents of shift register 133 is being shifted out onto the loop transmission link. Buffer register 137 is now available for storage of the bits to be transmitted in a next following time slot. While buffer register 137 is being reloaded under control of function control logic 139, the contents of intermediate buffer register 135 is transferred to output shift register 133, six bits at a time under control of oscillator and clock 103.

Oscillator and clock 103 is also connected to bit counter 141 which counts up to eighteen before generating a carry output which is connected to slot counter 143. The carry signal from bit counter 141 increments slot counter 143 which in turn is connected to cause interrupt control 145 to generate an interrupt signal to computer 13 indicating to computer 13 that the contents of buffer register 137 has just been transferred to registers 133 and 135 and, therefore, is available for reloading. Interrupt control 145 is also connected to interrupt mask register 147 and slot counter 143 to inhibit interrupts on selected slot counts and send the null bit pattern in the information slot so that computer 13 need only be interrupted when the next information slot to be transmitted has been assigned to an active terminal, and computer 13 desires to communicate with the terminal. Those slots in which computer 13 desires to transmit are indicated by the contents of interrupt mask register 147. When computer 13 receives an interrupt, it responds to output loop control 25 with read status and read slot counter commands which are decoded by command decode 127 to activate function control 139 to transfer the contents of status register 149 and slot counter 143 to data in bus 111 via OR gates 131. Computer 13, knowing the slot count of the next time slot to be transmitted, is then able to place information in the form of data or a command for the remote terminal to which the slot has been assigned in buffer register 137, by issuing a write slot command with the TC tag and an information byte with the TD tag. The write latches which were set in function controls 139 in response to the write slot command will cause the following data byte to be duplicated into the highest order 16 bit positions of output buffer register 137. The lowest order bit positions are loaded with the M1 and M2 modifier bits received as part of the write slot command bit pattern.

Referring now to the lower right portion of FIG. 2, the logic of input loop control 27 will be described in more detail. Input loop control 27 must operate in synchronism with, but at a time delay with respect to output loop control 25. For this reason, separate bit counter 161 and slot counter 163 is provided in input loop control 27. Bit counter 161 is free-running under advance signals from oscillator and clock circuits 103 and counts up to 18, generates a carry signal, and restarts again from 1. The carry signal from bit counter 161 advances slot counter 163 which likewise counts from 1 through 17 repetitively. When input loop control 27 has been addressed, address decode 117 will activate function controls 169. If the following command byte decoded at command decode 127 is a start loop command, the search mode latch in function controls 169 is set, which activates frame, null detect circuits 155 to begin searching input shift register 153 for the bit pattern of a frame slot shown in FIG. 1. When the frame slot is found, frame, null detect logic 155 resets the search mode latch in function control 169 and causes interrupt control 165 to generate an interrupt to computer 13. Other latches sequenced by clock 103 in function control 169 then cause the free-running bit counter 161 and slot counter 163 to be reset to the frame slot count and transfers the frame slot bit pattern from shift register 153 to IN buffer 157. The interrupt to computer 13 allows computer 13 to issue read status, read slot counter, and read slot L and read slot H commands to input loop control 27, thereby obtaining the information that input loop control 27 has become synchronized with output loop control 25. Once synchronized, the input loop control 27 interrupts computer 13 every slot time except those slots which contain the null information bit pattern as shown in FIG. 1. In this manner, computer 13 need not be interrupted to determine that no information is being received from the loop.

Figure 3:
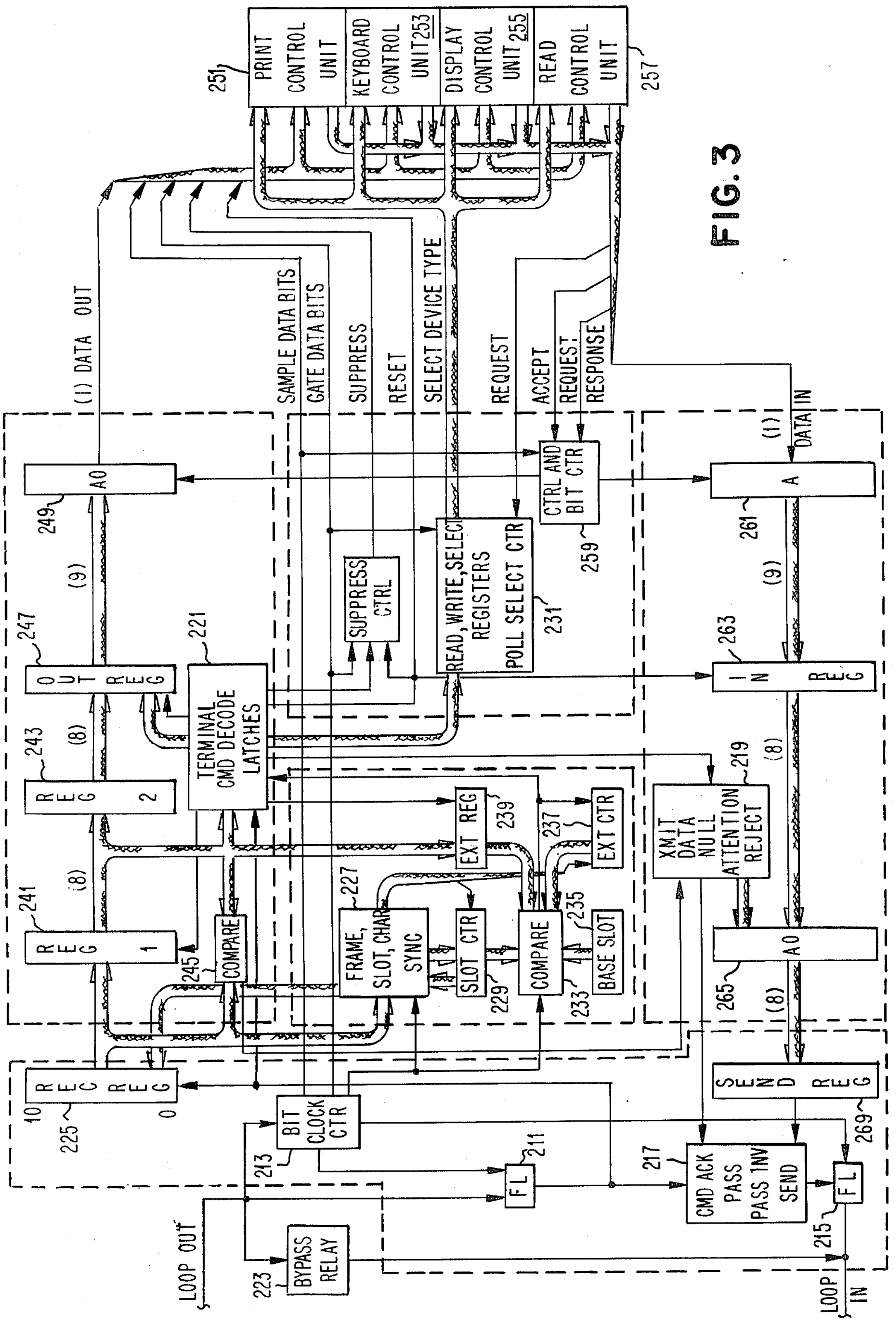
FIG. 3 illustrates logic circuitry for connecting an input output terminal comprising a plurality of devices such as a printer, a cash issuing terminal, a keyboard, or a display to a loop communication link which operates in accordance with the invention.

Referring now to FIG. 3, the detail logic by which various devices at a remote terminal 15, 17, etc., are connected to and synchronized with the loop for communication with computer 13 will be described. Five groups of logic circuits are shown in FIG. 3, each enclosed within a dotted line. The circuits enclosed within each dotted line are representative of circuits contained on one integrated circuit chip in this preferred embodiment.

As previously described, information is received from the loop in the form of eighteen bit time slots which carry a frame bit pattern, a null bit pattern, a command bit pattern, or a data bit pattern. Each remote terminal is connected in series with the loop at the input of a receive latch 211 and a bit clock counter 213. Bit clock counter 213 is a simple phase locked oscillator which follows each bit as received from the loop, providing a plurality of phase outputs to gate loop receive latch 211 and loop send latch 215. Information is passed from receive latch 211 to send latch 215 through simple AND OR gate logic 217 labeled command acknowledge, pass, pass invert, and send. These AND OR gates are opened and closed under control of latches in transmit logic 219 which are in turn controlled by terminal command decode latches 221. But if neither transmit data, transmit null, transmit inverse; transmit attention, or transmit reject latches are set in transmit logic 219, the AND OR gates 217 will pass or echo each bit of information received from the loop at receive latch 211 on through send latch 215 and back out onto the loop toward input loop control 27 shown in FIG. 2. In the event that the terminal is not operational for some reason, a bypass relay 223 is provided with normally closed points so that whenever power is removed from any remote terminal, its respective bypass relay points will close effectively shorting out and bypassing its respective receive and send latches 211 and 215.

As previously described with respect to FIG. 1, information is serially received from computer 13 in slots of 18 bits, each of which are transferred from the output of receive latch 211 to the input of receive register 225 under control of bit clock counter 213. When power is first turned on at the remote terminal, the sync latches in frame, slot, character sync logic 227 will be reset. In this mode of operation, sync logic 227 will continually inspect the contents of receive register 225 looking for the frame slot bit pattern. When the frame slot bit pattern is detected, slot counter 229 is reset and the following slots will be counted. When 17 slots have been counted, receive register 225 is again inspected for the frame slot bit pattern and, if found, sync logic 227 sync latches are set. Normal operation will follow under control of commands and data received from computer 13.

Figure 4:
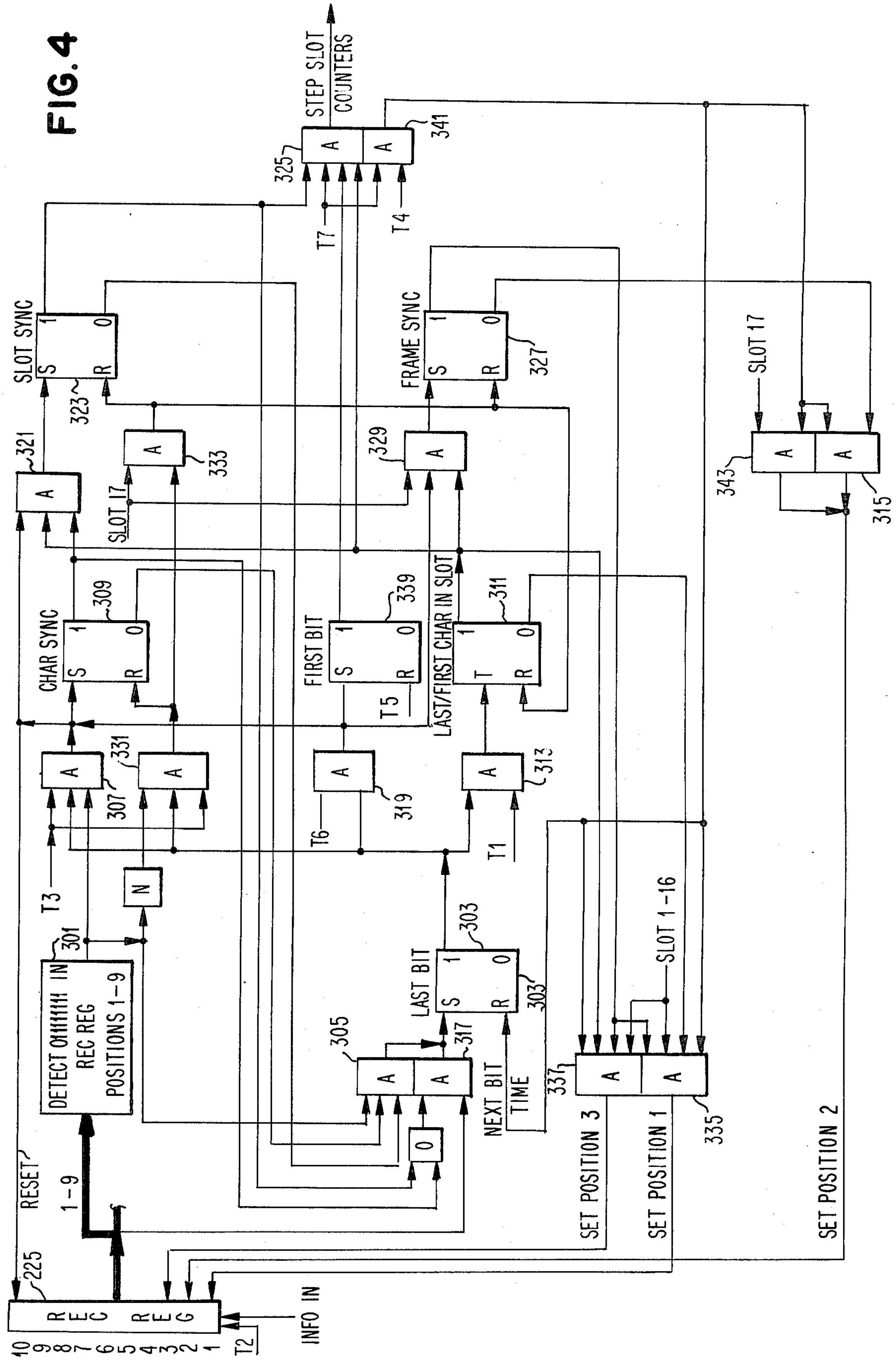
FIG. 4 shows example detail logic for implementing the invention.

Referring now to FIG. 4, a more detailed description of the logic contained within frame, slot, character sync logic 227 will be described as exemplary of logic which one skilled in the art of logic design will be able to design for implementing other logic blocks shown in FIGS. 2 and 3. Receiver register 225 is again shown in this FIG. 4 because it is used as a variable length bit counter as well as a deserializing shift register. In order to use receive register 225 as a variable length bit counter, marker bits are loaded into positions 1, 2 or 3. A marker bit is loaded when the first or the eleventh bit of a slot has been shifted into the first bit position of receive register 225. When looking for the ten bits comprising M1, M2 and the first byte of the slot, the marker bit is loaded into position one on top of the M1 bit which has already been detected by command decode 221 directly from receive latch 211. When looking for a nine bit frame character, the marker bit is loaded into position two. When looking for the last byte of a slot, the marker bit is loaded into position three. When a marker bit exits at position 10, an 8 bit character is located at positions 1-8 or a frame character is located at positions 1-9 in receive register 225.

The logic required to perform these synchronizing functions will now be described. All of the counters and latches are reset to a zero state when power is first turned on at a remote terminal. When 8 contiguous binary one bits appear in receive register positions 1-8 and a zero bit in position 9, AND gates within frame character detect circuits 301, set last bit latch 303 through gate 305 after which gate 307 sets character sync latch 309 and resets the contents of receive register 225 to zero. First bit latch 339 is set by AND gate 319 at T6 which is near the end of the last bit time fo each character. During T1 of the next bit time, which is the first bit of the last character in the slot, last/first character in slot flip-flop 311 is flipped to its last character state by gate 313. Also, during the next bit time, first bit latch 339 remains set until T5 time, allowing gate 315 to load a marker bit into receive register 225 position 2 at T4 time after the tenth bit of the frame character has been loaded into position 1. The 11th through 18th bits of the frame slot bit pattern are then shifted into receive register 225 under control of bit clock counter 213 as they are received. When the marker bit reaches position 10, last bit latch 303 is set again by gate 317 causing gates 307 and 321 to set slot sync latch 323. The slot sync latch 323 conditions gate 325 to step the slot counter 229 at T7 which is the end of the last bit time of this slot and of each following slot. At T1 of the next bit time, gate 313 returns flip-flop 311 to its first character state, to gate marker bits into position 2 of register 225 via gates 341 and 315 or 343, searching for frame characters. When the slot counter reaches a slot count of 17, frame sync latch 327 is set by gate 329 if a frame character is detected in both the first and second halves of this slot 17. If a frame character was not detected in each half of slot 17 by detect logic 301, gate 331 will reset character sync latch 309 and condition gate 333 to reset slot sync latch 323, frame sync latch 327, and flip-flop 311, to start all over again. When frame sync latch 327 is set, gates 341, 335 and 337 are used to insert marker bits into position 1 and 3 of receive register 225, respectively, for loading a 10 bit character during the first halt of a slot and an 8 bit character during the last half of a slot into receive register 225, respectively. The signals labeled T1, T2, T3, T4, T5, T6, and T7 are phase times within each bit time provided by bit clock counter 213 to prevent race conditions within the various latches shown in FIG. 4, and others in FIGS. 2 and 3.

It can be seen from the above description, that the logic contained within frame, slot, character sync logic 227 is of a relatively straightforward logic design which utilizes the known bit pattern of the frame slot to achieve synchronism between slot counter 229 and frames of slots being transmitted by loop output control 25. The logic of FIG. 4 will be taken by those skilled in the art of logic design as an example which may be followed when implementing the logic functions which have been defined for terminal command decode 221, transmit logic control 219, select registers and poll counter 231 as well as function controls 139 and 169 in FIG. 2 and other similar logic blocks. Thus, although every detail of each of these logic control blocks is not described, it is well within the skill of the art to make and use applicant's invention using the techniques set forth in FIG. 4 as an example.

Referring again to FIG. 3, the logic for accomplishing information slot assignment to a remote terminal will now be described. Once slot counter 229 has been synchronized with frames of information slots being received from the loop, compare circuits 233 will provide an output to command decode latches 221 whenever the contents of slot counter 229 equals the base slot count. In this preferred embodiment the base slot count is stored in a plurality of wireable connectors 235 which are wired so as to generate the binary count equal to the base slot count assigned to a particular remote terminal. It would, of course, be practical to store the base slot count in a register. However, a more complicated technique for loading the register would then be necessary than that technique being used to load extra slot register 239, which will be shortly described. The circuits within compare 233 include two sets of compare gates, each of which provides a signal on the output line from compare 233 to command decode 221 when its input slot counts are equal. Slot counter 229 and base slot bit pattern 235 are connected to the inputs of the first set of compare gates. Extra slot counter 237 and extra slot register 239 are connected to the inputs of the second set of compare gates to activate the same output line to command decode latches 221. Extra slot counter 237 contains an inhibit AND gate in series with its increment input from AND gate 325 so that counter 237 can be inhibited from counting between the frame slot and the base slot permanently assigned to a terminal. The inhibit AND gate is conditioned to pass increment pulses to advance the extra slot counter by the true output of a base slot found latch also in counter 237 which has a set input connected to the output of compare 233, which first provides an output signal when the base slot count in slot counter 229 compares with the assigned base slot count in wireable connectors 235. The base slot found latch has a reset input connected to the output of frame character detect via AND gate 307 to inhibit counting by the extra slot counter until the base slot is reached as described above. The extra slot counter is reset to a zero count by the output of compare 233 through a short digital logic delay circuit to prevent race conditions. Extra slot register 239 is loaded with the set slot count command shown in FIG. 1 to a slot count such as 3 to assign every third slot following the base slot to this particular remote terminal. Extra slot register 239 therefore has a data input from the output of register 1 and a load control input from command decode latches 221.

Referring now to the top of FIG. 3, register 1 numbered 241 has parallel input connections from the outputs of the first 8 bit positions of receive register 225, the contents of which are transferred under control of latches 221. When a command, as shown in FIG. 1, is received from the loop, modifier bit M1 will be a binary 1 and will eventually appear in the tenth bit position in receiver register 225. Comand decode 221 is connected to slot counter 229 through compare circuits 233 and to the output of receive latch 211 and is thereby informed that the first bit of its assigned time slot is a one bit. When both bytes of this command have been received, command decode 221 activates compare logic 245 to compare the contents of the first 8 bit positions of receive register 225 with the contents of register 241. If the two redundantly transmitted command bytes compare, latches in command decode 221 are set to carry out the sequence of operations required to execute the command.

A time slot in which noncomparing bytes were received will have already passed this remote terminal and, while passing, command acknowledge gates within logic 217 were activated by transmit logic 219 in response to command decode 221 having recognized a command was being received to change the state of modifier bit 2 from a zero to a one, indicating to the computer 13 that a command was received but not whether it was correctly received because at that time the two redundant bytes of the command have not yet been received by the remote terminal. The computer 13 must compare the two echoed command bytes with those transmitted to the remote terminal to detect an error.

If the command which was just received is a set slot count command, the lower order 4 bits of register 241 will be gated into extra slot register 239 by command decode latches 221, thereby assigning extra slots to this remote terminal. If the command which has been received is a write echo command, as shown in FIG. 1, different command decode latches will be set and the two different data bytes from a following assigned slot will be transferred into registers 243 and 247 without comparison by compare circuit 245. While these write echo first and second data bytes are being transferred, logic 217 will be in pass and pass invert modes respectively to echo the data back through input loop control 27 to computer 13 for comparison with the data which was transmitted to determine that it was properly received. The write echo data is held in registers 243 and 247 until the next information slot assigned to this remote terminal is received. If a reject out command is received instead of more data, the data in registers 243 and 247 will be reset and their contents is not sent out to the intended device. If more data is received, the two bytes in registers 243 and 247 are sequentially transferred though output register 247 where the data flag binary zero bit is added and serialized by AND/OR gates 249 for transmission to the device.

If the command which has been received is a write redundant command and if compare 245 does not detect that the bit patterns of the two redundantly transmitted data bytes are equal, an output is provided to transmit logic 219 to transmit a reject command bit pattern through AND OR logic gates 265 and send shift register 269, back to computer 13 in the next slot which has been assigned to this remote terminal.

Referring now to the right portion of FIG. 3, communication with device control units will be described. Each device control unit such as print control unit 251 is designed using well known logic design techniques as exemplified by device control units which have in the past been designed to connect to an IBM System 360 channel. The only substantial difference between print control unit 251 and an IBM System 360 I/O device control unit is that data and command bit patterns are transmitted serially to print control unit 251 in order to save contact pads on integrated circuit chips used to implement the previously described logic between the loop and the device control units.

In addition to a serial data out line and the serial data in line, each device control unit receives two timing lines labeled sample data bits and gate data bits, four device type select lines to select the device for which the data or command is intended, suppress and reset lines which are used for control purposes, and three input lines as shown in FIG. 3. The four select lines are connected to the select counter which can be loaded by command decode latches 221 with the device type identifier. The select counter is connected to the select lines by a plurality of logic gates. The logic gates cause the select lines to rise before the rise of a signal on the line labeled gate data bits, remain up for nine full bit times, and fall after the fall of the ninth bit time. The sample data bits line is self explanatory in that it provides narrow sample times within which a bit of data on the data out line is valid. After the device type select lines have been raised in a combination identifying a device type, the device adapter so identified must raise a signal on the accept line input line to indicate that it is not busy and may accept data or a command. Data is transmitted as previously described on serial data out line. A command is likewise transmitted on the data out line but the ninth or flag bit is set to a one indicating that the bit pattern is a command such as write, read, sense, or end operation. The bit pattern may be the same as the bit pattern received from the loop or it may have been translated by command decode 221. In the particular embodiment being described, command decode latches 221 set four separate latches, one for each of the previously recited commands which in turn places a binary 1 bit in a corresponding one of four different bit positions in the command bit pattern following the binary one flag bit. Data and device control parameter transmission at the initiative of computer 13 to a device control unit is identical to that just described for a command with the exception that the flag bit will be a zero indicating the bit pattern to be data. If a device control unit initiates communication with computer 13, it places a signal on the request input line to indicate that it has information ready to be sent to computer 13. This line is used in conjunction with the select counter which is incremented by bit clock counter 213 to poll each device control unit until the one of the device control units which activated the request line responds by raising a signal on the request response line. The device control unit then places the first bit of data on the data in line and drops the signal from the request line. The suppress line is used to suppress communication from a device control unit when command decode latches 221 are active in the execution of a command not associated with a particular device such as the set slot register command. The reset line is self-explanatory in that it acts to reset all device adapters when power is first turned on at the remote terminal, or when a reset command has been received from computer 13.

Referring now to the bottom portion in FIG. 3, the data input path from a device control unit to computer 13 will be described. After accept or request response has been received by control and bit counter 259, data bits are clocked through AND gate 261 to input register 263. If data is being transferred in response to a read command, command decode 221 will cause the data in input register 263 to be transferred through AND OR gates 265 and serializing send register 269 to the loop. When data is received, the flag bit will be a binary zero. If the information being received from the device control unit is an attention byte, the flag bit will be a binary one.

In order to allow a second remote terminal to utilize slots which have been temporarily or permanently assigned to a first remote terminal, a psuedo device latch is included in command decode latches 221. The psuedo device latch is set whenever a write echo command to a non-existant device type is received at the terminal. When the psuedo device latch is set, information received at the terminal is echoed without change and without inverting the second byte so that although a time slot may still be assigned to the terminal, the terminal is presently inhibited from changing information in the time slot thereby making such information available for a second terminal. Additionally the first terminal, having its write psuedo device latch set is inhibited from acting upon any of the information being echoed because it is identified with devices other than the specific psuedo device type associated with the write echo command. The psuedo device latch of command decode latches 221 in the first terminal will be reset when an end operation command is received at the first terminal addressed to the same non-existant psuedo device to which the write echo command was originally directed. In this manner other end operation commands directed to other devices attached to a second terminal temporarily utilizing the first terminals information slots will not affect the write echo mode of the first terminal.

While the invention has been shown and described with respect to a preferred embodiment using integrated circuits, specific devices, and other limitations for purposes of facilitating comprehension of the invention and to show how one of ordinary skill in the art of logic design might use the invention, it will be understood that various changes in form and detail may be made without departing from the spirit and scope of the invention.

What is claimed is:

1. A data transmission system comprising:

a central controller;

a plurality of remote terminals;

means providing a loop signal path between said central controller and each of said remote terminals in a multiplexed sequence of time slots, at least one different time slot being associated with each of said remote terminals;

control means at said central controller for transmitting a load slot count command and a slot count from said central controller to a remote terminal;

command decode means at said remote terminal for storing said slot count in response to said load slot count command;

comparator means at said remote terminal for comparing a number of slots counted by a slot counter with said stored slot count and actuating said terminal to transmit and receive in a slot whenever the slots counted is equal to said stored slot count;

whereby said slot is associated with said terminal.

2. A data transmission system of claim 1 wherein said slot counter restarts counting following each of said time slots associated with said remote terminal.

3. The data transmission systems of claim 1 wherein said control means at said central controller transmits a plurality of frames of time slots, the number of time slots in each frame being in excess of the number of remote stations connected to said means for providing a loop signal path, each time slot further comprising a modifier bit position for identifying the following information bytes as a command.

4. The data transmission system of claim 3 wherein each of said command bytes includes a device type identifier field and a command field.

5. The data transmission system of claim 1 wherein said load slot count command is duplicated in a time slot and said remote terminal further comprising compartor means for comparing first and second commands in said time slot and actuating said command decode means upon a true comparison.

6. The data transmission system of claim 1 wherein said command decode means at a first remote terminal is responsive to a write echo command to a non-existant device type at said first terminal to allow following information bits in information slots assigned to said first remote terminal to be echoed without change on said loop signal path;

whereby said extra slot register in a second remote terminal may control said second terminal to utilize information echoed by said first remote terminal.

7. A terminal for communication over a loop signal path with a central controller in a multiplexed sequence of time slots, at least one time slot being associated with said terminal, wherein the improvement comprises:

extra slot storage means at said terminal for receiving a slot count from said central controller;

command decode means at said terminal for storing a slot count in said extra slot storage means in response to a load slot count command received from said central controller;

comparator means at said terminal for comparing a number of slots counted by a slot counter with said stored slot count and actuating said terminal to transmit and receive in a slot whenever the slots counted is equal to said stored slot count;

whereby said slot is associated with said terminal.

8. The terminal of claim 7 wherein said slot counter restarts counting following each of said time slots associated with said terminal.

9. The terminal of claim 7 wherein said command decode means is responsive to a modifier bit position of a time slot for identifying the following information bytes as a command.

10. The terminal of claim 9 wherein each of said command bytes includes a device type identifier field and a command field.

11. The terminal of claim 7 wherein said load slot count command is duplicated in said associated time slot and said terminal further comprises comparing means for comparing first and second commands in said time slot and actuating said command decode means upon a true comparison.

12. The terminal of claim 7 wherein said command decode means is responsive to a write echo command to a non-existent device type at said terminal, to allow following information bits in information slots assigned to said terminal to be echoed without change on said loop signal path;

whereby an extra slot storage means in a second terminal may control said second terminal to utilize information echoed by said first terminal.

* * * * *